United States Patent [19]

Tamura et al.

[11] Patent Number: 4,732,674

[45] Date of Patent: Mar. 22, 1988

[54] WATER PURIFIER

[75] Inventors: Kozo Tamura; Syoichi Nihira; Akira Maejima; Kenzo Mikada, all of Hitachi, Japan

[73] Assignee: Hitachi, Ltd., Tokyo, Japan

[21] Appl. No.: 33,893

[22] Filed: Apr. 3, 1987

Related U.S. Application Data

[63] Continuation of Ser. No. 805,786, Dec. 6, 1985, abandoned.

[30] Foreign Application Priority Data

Dec. 6, 1984 [JP]  Japan ................................ 59-256540

[51] Int. Cl.⁴ .............................................. C02F 1/28
[52] U.S. Cl. .................................... 210/266; 210/282; 210/423; 210/502.1; 210/506
[58] Field of Search ............... 210/679, 680, 694, 807, 210/266, 282, 502.1, 503, 504, 506, 421–424, 449

[56] References Cited

U.S. PATENT DOCUMENTS

| | | | |
|---|---|---|---|
| 1,539,295 | 5/1925 | Brown | 210/504 |
| 1,798,164 | 3/1931 | Kuhn et al. | 210/504 |
| 3,276,186 | 10/1966 | Hronas et al. | 210/504 |
| 3,327,859 | 6/1967 | Pall | 210/502.1 |
| 4,107,046 | 8/1978 | Corder | 210/282 |

FOREIGN PATENT DOCUMENTS

| | | |
|---|---|---|
| 1355674 | 6/1974 | United Kingdom . |
| 1380636 | 1/1975 | United Kingdom . |
| 2024191 | 1/1980 | United Kingdom . |

*Primary Examiner*—Ivars Cintins
*Attorney, Agent, or Firm*—Antonelli, Terry & Wands

[57] ABSTRACT

A water purifier houses a material for water treatment. The water purifier employs an active carbon as this water purifying material, and this active carbon has pores on the surface of which water soluble mineral component is provided.

9 Claims, 2 Drawing Figures

WATER PURIFIER

This application is a continuation of application Ser. No. 805,786, filed Dec. 6, 1985, now abandoned.

BACKGROUND OF THE INVENTION

1. Field of the Invention

The present invention relates to a water purifier, and more particularly, to a water purifier employing a water purifying material which contains water soluble mineral components.

2. Description of the Prior Art

Heretofore, water purifiers of this type have been known, and one of such typical purifiers employs a natural stone such as an ore contained with mineral components as the water purifying material. This type of water purifier, however, suffers from a problem in that the stone employed as the water purifying material has few mineral components which dissolve in treated water. Therefore, a water purifier has been proposed which employs solidified minerals such as calcium hydroxide as the material for treating water. This type of water purifier also involves problems in that the mineral components in the water purifying material which continue to dissolve even when water remains stagnant until its concentration becomes too high soon become too sticky to be used. To obviate these disadvantages, Japanese Utility Model Laid-Open No. 48795/1984 discloses a water purifier which employs a solid ceramic material as the material for treating water the material being fired but not glazed and containing minerals such as calcium oxide. In this type of water purifier, however, only a small quantity of mineral components is absorbed by the water because the surface area of its water purifying material cannot be made large enough to ensure that a sufficient amount of the mineral components are dissolved. Further, each of these known water purifiers additionally suffers from the problem that chlorine and other impurities which impair the taste and odor of water cannot be sufficiently removed.

SUMMARY OF THE INVENTION

Accordingly, an object of the present invention is to provide a water purifier employing a water purifying material which is capable of purifying water by removing chlorine and the like, and which contains water soluble mineral component which dissolves in water at a controlled range of concentration.

To this end, according to the invention, there is provided a water purifier incorporating a water purifying material, wherein the improvement is characterized in that active carbon is employed as the water purifying material, and that water soluble mineral component is provided on the surface of pores of this active carbon.

More specifically, in the case of employing an active carbon with mineral component provided thereon as a water purifying material, impurities in water such as chlorine which impair the odor and taste of water can be removed. At the same time, it is possible for the mineral component which is provided on the activated surface of the active carbon to be dissolved in a treated water at a certain range of concentration.

DESCRIPTION OF THE PREFERRED EMBODIMENT

Figure 1:
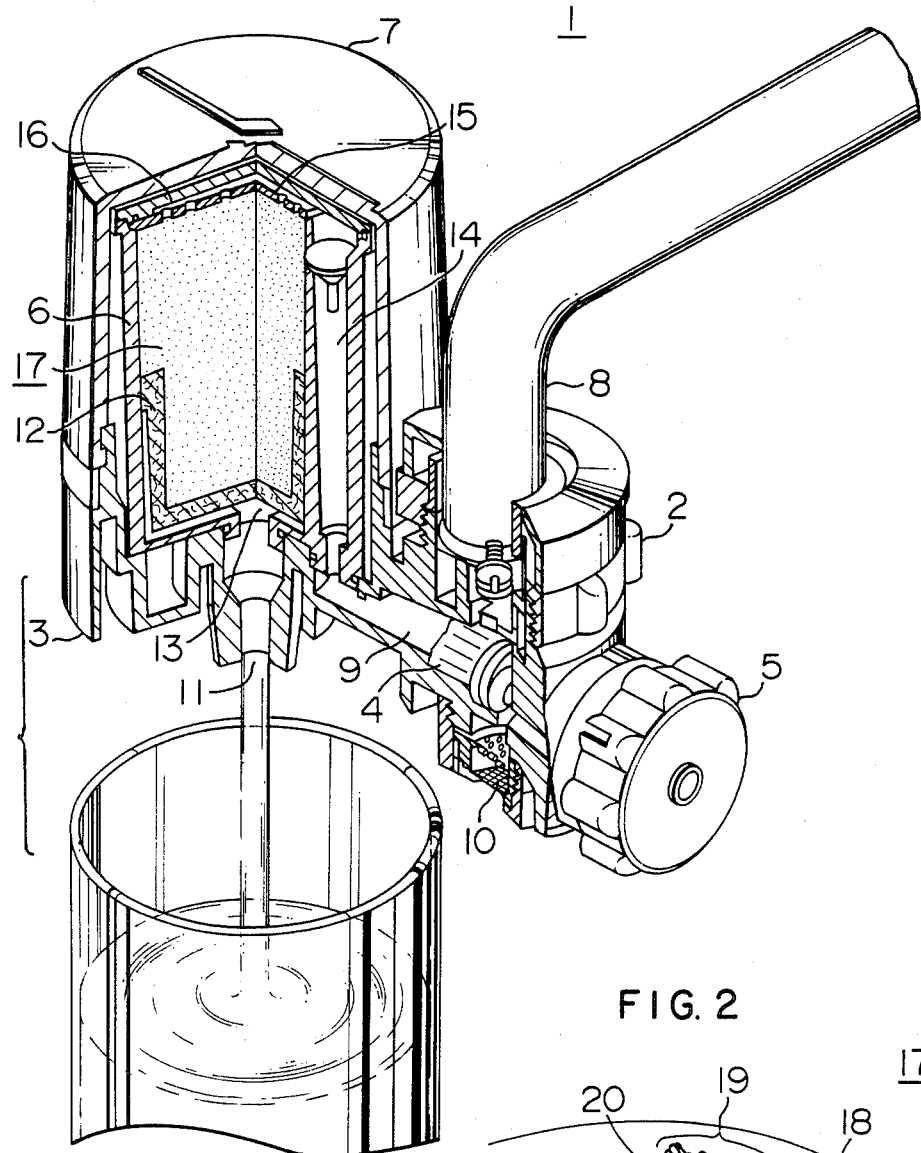
FIG. 1 is a perspective side view of an embodiment of a water purifier according to the invention, with parts broken away and in section.

A preferred embodiment of a water purifier according to the invention will be described hereinunder with reference to the accompanying drawings.

Referring to the Figures, the reference numeral 1 designates a water purifier which is mainly composed of a housing having a faucet connecting portion 2, a body 3, a change-over valve 4, a knob 5, a cartridge 6 through which water can be passed, and a cover 7, and which can be mounted on or dismounted from a faucet 8 by means of the faucet connecting portion 2.

By turning the knob 5, the flow of water is changed over within a change-over passage 9 by means of the change-over valve 4 so that it is directed either toward an untreated water outlet 10 or a purified water outlet 11.

Further, the cartridge 6 contains at its bottom a filter 12 for filtering water, and opens to the purified water outlet 11 through an effluent passage 13. The cartridge 6 is also provided with an influent passage 14 which extends from the change-over passage 9 and communicates with a water holding portion 15 provided between the cartridge 6 and the cover 7. Water to be treated is evenly distributed by a strainer 16 at the holding portion 15, and then passes through a water purifying material 17 which treats water and is contained in the cartridge 6.

Figure 2:
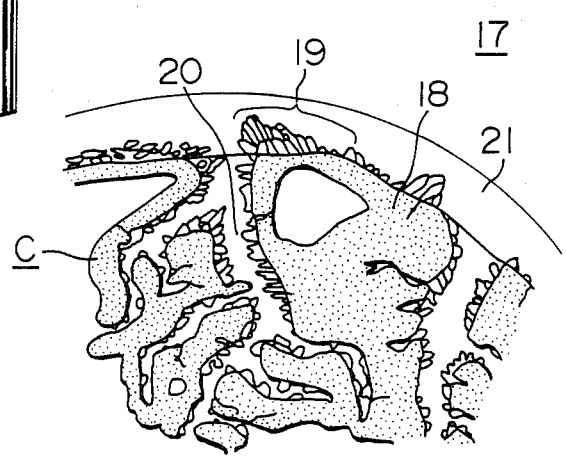
FIG. 2 is a view of the water purifying material employed in the water purifier according to the invention, which is enlarged in a simulated manner.

The water purifying material 17, as shown in FIG. 2, has a substance 18 which is made of granular active carbon C, and which has pores 20 on the surface of which a film 19 of mineral components such as calcium carbonate and sodium carbonate is provided. As can be seen in FIG. 2, pores 20 extend from the outer periphery of the activated carbon C to within the interior of the active carbon C and are open to the outside of the active carbon C at its periphery. The mineral component film 19 is provided both on the periphery of the active carbon C and on the interior surfaces of the pores within the active carbon C, including surfaces deep within the active carbon C. The mineral component is provided as a film 19 with such a thickness so as to leave void spaces in the pores 20.

The reference numeral 21 denotes a fluidic film which is to be described later.

With the above arrangement, the water purifier is operated as follows.

For supplying raw water, water flows through the faucet 8, the change-over valve 4 and the raw water outlet 10 in this order and is discharged without being treated. On the other hand, for supplying treated water, water, after the flow thereof is changed over by the change-over valve 4, flows through the change-over passage 9, the influent passage 14, the holding chamber 15, the filler 17, the filter 12, the effluent passage 13 and the purified water outlet 11 in this order for treatment.

Since the purpose of water treatment is to obtain water which is fit for drinking, it is necessary for the treated water to contain mineral components at a concentration which is close to that of natural water and to keep it near that value.

In other words, it is necessary for the mineral components to be adequately soluble in the water which passes through the purifier so that the treated water always contains more than a certain amount of mineral components. When supply of water to the purifier is stopped, however, it is essential that the mineral components are not dissolved in the water held near the film 19 of mineral components to an excessive degree.

Preferably, water having, for example, a hardness of 50 mg/l is treated such as to have a hardness ranging between 70 and 150 mg/l, so that it is fit for drinking.

The above-described water purifying material 17 can satisfy these conditions, and the following describes how this is realized. When water fills the water purifying material, the water filling the pores 20 of the active carbon C contains mineral components in a saturated state, and the mineral components contained in this water dissolve in treated water by virtue of diffusion. The mineral components, however, are restricted from diffusing freely because of the presence of the fluidic film 21 which is provided on the periphery of the active carbon C grains, and which provides resistance against diffusion of mineral components. When there is only stagnant water present in the purifier, this resistance of the film 21 becomes very large, allowing only a small amount of mineral components to pass through this film 21, thereby preventing the concentration of the mineral components in the treated water from becoming high. On the other hand, while water is passing through the purifier, the flow of water reduces the diffusion resistance of the fluidic film 21, and the mineral components contained in the water filling the pores 20 are easily diffused, thereby preventing the lowering of the mineral concentration of the water treated by this purifier.

Further, the active carbon C has many pores 20 each having a size of about several tens Å, and the pores 20 have a large surface area as well as a volume which is sufficient for providing an adequate amount of the mineral components which diffuse from these pores 20.

Additionally, since the substance 18 of the above described water purifying material 17 is itself made of active carbon C which is itself capable of removing chlorine and other impurities in water which impair its taste and odor, another medium need not be provided specifically for the purpose of filtration. This means that the water purifier of this embodiment need only to employ a single water purifying material, and therefore makes the structure of the cartridge 6 simple, as well as making its production easy.

The mineral components employed in this embodiment can, in addition to the above-described calcium carbonate and sodium carbonate, also include, for example, calcium bicarbonate, magnesium carbonate and the like.

According to the present invention, it is possible to provide a water purifier which is capable of treating water by removing chlorine and the like, and at the same time which is so improved as to supply mineral components which are soluble in treated water within a controlled concentration range.

What is claimed is:

1. A water purifier comprising a housing having an inlet for raw water to be purified and an outlet for purified water, said housing containing a cartridge comprising a water purifying material arranged therein so that the raw water to be purified passes through said water purifying material when the raw water to be purified is supplied from the inlet for raw water, characterized in that granular activated carbon having a plurality of pores is employed as said water purifying material, said pores extending from an outer periphery of said granular activated carbon to within the interior of said granular activated carbon and being open to the outside of said granular activated carbon at its periphery; a water-soluble salt selected from the group consisting of calcium carbonate, sodium carbonate and magnesium carbonate is provided on surfaces of the pores within said granular activated carbon so as to permit said water-soluble salt to dissolve into the water; and a fluidic film is provided on the periphery of said granular activated carbon; wherein said water-soluble salt is dissolved in a manner such that water filling said pores of said granular activated carbon contains the water-soluble salt in a saturated state.

2. A water purifier according to claim 1, further comprising a filter provided between the water purifying material and the outlet for purified water.

3. A water purifier according to claim 1, further comprising means for connecting the housing to a faucet for supplying raw water to be purified and a passage leading to the inlet for raw water to be purified from said connecting means.

4. A water purifier according to claim 3, further comprising a raw water outlet for discharging untreated raw water and a change-over valve for allowing selection of treated purified water or untreated raw water, said change-over valve allowing flow of raw water to said passage when treated purified water is selected and allowing flow of raw water to said raw water outlet without passing through said water purifying material when untreated raw water is selected.

5. A water purifier according to claim 1, further comprising a water holding portion between the inlet for raw water and the water purifying material.

6. A water purifier according to claim 5, wherein said holding portion is provided in a down-flow portion with a strainer by which water to be treated is evenly distributed before passing through said water purifying material.

7. A water purifier according to claim 1, wherein said water soluble salt is provided on the surface of said pores of said granular activated carbon in the form of a film.

8. A water purifier according to claim 7, wherein said film is of a thickness such that void spaces are left within said pores.

9. A water purifier according to claim 1, wherein said water-soluble salt is provided deep within the interior of said granular activated carbon.

* * * * *